United States Patent
Yamada et al.

(10) Patent No.: US 6,747,553 B2
(45) Date of Patent: Jun. 8, 2004

(54) APPARATUS FOR DETECTING ROTATIONAL STATE OF WHEEL

(75) Inventors: Noritaka Yamada, Mishima (JP); Toshinobu Ota, Saya-cho (JP); Yasuhito Ishida, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 103 days.

(21) Appl. No.: 09/964,434

(22) Filed: Sep. 28, 2001

(65) Prior Publication Data

US 2002/0040268 A1 Apr. 4, 2002

(30) Foreign Application Priority Data

Sep. 29, 2000 (JP) ........................................ 2000-300182

(51) Int. Cl.[7] .................................................. B60Q 1/00
(52) U.S. Cl. ........................ 340/441; 340/444; 340/448; 340/672; 340/686.3; 324/165; 324/166; 324/207.25; 701/71
(58) Field of Search ................................. 340/441, 444, 340/453, 442, 448, 438, 686.3, 671, 672; 180/197; 701/71, 74, 79; 324/207.13, 165, 166, 202, 207.25; 188/197, 282; 303/113.5, 122; 702/145, 148

(56) References Cited

U.S. PATENT DOCUMENTS

| | | | |
|---|---|---|---|
| 4,331,917 A | 5/1982 | Render et al. ............... 324/166 |
| 5,141,071 A | * 8/1992 | Edahiro et al. ............. 180/197 |
| 5,741,966 A | * 4/1998 | Handfield et al. .......... 73/146.5 |
| 6,282,954 B1 | * 9/2001 | Ott et al. ....................... 73/488 |
| 6,492,804 B2 | * 12/2002 | Tsuge et al. ................. 324/166 |
| 6,498,474 B1 | * 12/2002 | Turner | |

FOREIGN PATENT DOCUMENTS

| | | |
|---|---|---|
| DE | 37 33 136 A1 | 4/1989 |
| JP | 59-224569 | 12/1984 |
| JP | 196 50 935 A1 | 6/1998 |
| JP | A 2000-187039 | 7/2000 |

* cited by examiner

Primary Examiner—Davetta W Goins
(74) Attorney, Agent, or Firm—Oliff & Berridge, PLC

(57) ABSTRACT

Provided is rotational-state-of-wheel detecting apparatus that can avoid output of an incorrect rotational direction during a halt of a wheel. In ECU 10, a signal input section 10a accurately detects wheel speeds and rotational directions of respective wheels 12, 14, 16, 18, and, based on the results, respective computers 10b, 10c, 10d execute ABS control, TC control, and VSC control. On this occasion, switching of the rotational direction is restricted with a computation result of wheel speed of zero, and it is thus feasible to prevent occurrence of a malfunction or state hunting being repetitive switching of signs, due to an external magnetic field during halts of the wheels 12, 14, 16, 18. This further optimizes the state control of a vehicle.

8 Claims, 4 Drawing Sheets

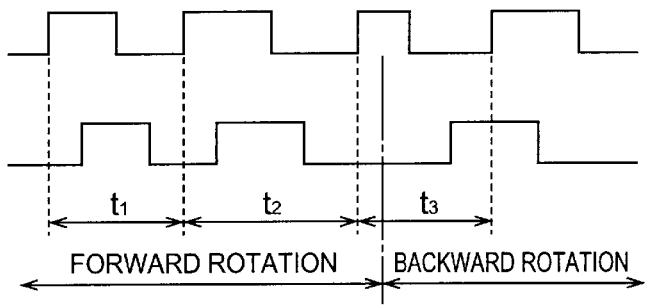
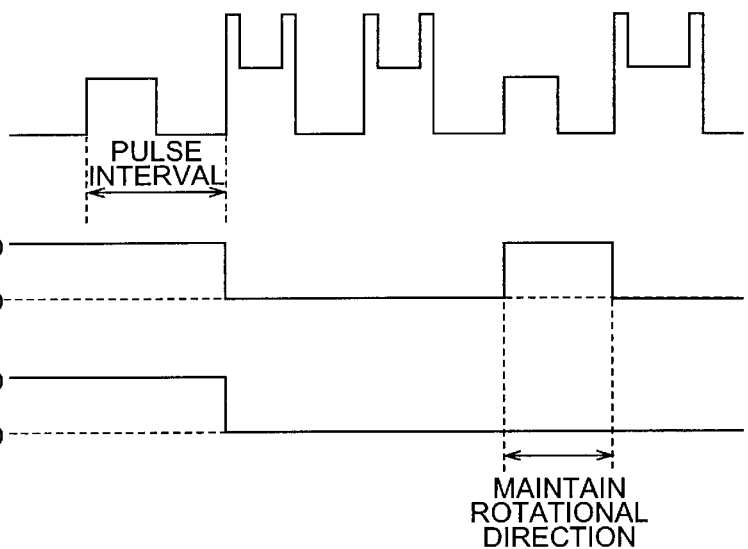

APPARATUS FOR DETECTING ROTATIONAL STATE OF WHEEL

BACKGROUND OF THE INVENTION

1. Field of the Invention

The present invention relates to apparatus for detecting a rotational state of a wheel mounted on a vehicle.

2. Related Background Art

Japanese Patent Application Laid-Open No. 2000-187039 discloses a system including a pair of sensors per rotating body, e.g., a wheel, and adapted to detect a rotational direction of this rotating body in accordance with phase states of detection outputs from the pair of sensors.

In use of the rotational state detecting system as described above, however, when a wheel is in a halt (including states equivalent to a halt), the system can sometimes fall into such an unstable state that the output of rotational direction of the wheel is indistinguishable or the system can sometimes output an incorrect rotational direction because of influence of an external magnetic field, a magnetic environment, or the like. Such output signals are unwelcome to optimal operations of on-vehicle systems including an antilock brake system (hereinafter referred to as ABS) and others in certain cases.

SUMMARY OF THE INVENTION

An object of the present invention is, therefore, to provide rotational-state-of-wheel detecting apparatus that can avoid the output of the incorrect rotational direction and the unwanted change of rotational direction even during halts of a vehicle.

In order to accomplish the above object, a rotational-state-of-wheel detecting apparatus according to the present invention is an apparatus for detecting a rotational state of a wheel, comprising a rotating member which rotates together with the wheel, a detected portion provided at the rotating member, detecting means for detecting passage of the detected portion to output a detection signal, and rotational direction detecting means for detecting a rotational direction of the wheel, based on the output of the detecting means, the apparatus further comprising halt detecting means for detecting whether the wheel is in a halt or not, and restricting means for restricting a change of the rotational direction detected by the rotational direction detecting means, when the halt detecting means detects that the wheel is in a halt.

In the above rotational state detecting apparatus, when the halt detecting means detects that the wheel is in a halt, the restricting means restricts the change of the rotational direction detected by the rotational direction detecting means, so that the apparatus can avoid repetitive switching of output between forward and backward rotational directions and output of an incorrect rotational direction in a state in which the wheel is judged in a halt.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 2A and 2B are timing charts for explaining the principle of the detection of rotational speed and rotational direction.

FIG. 3A is a timing chart for explaining a specific output signal from a magnetic sensor unit.

FIGS. 3B and 3C are timing charts showing the results of detection and correction for the rotational direction of the wheel.

DESCRIPTION OF THE PREFERRED EMBODIMENTS

The rotational state detecting apparatus of the vehicle being an embodiment of the present invention will be described below with reference to FIG. 1 to FIG. 5D.

Figure 1:
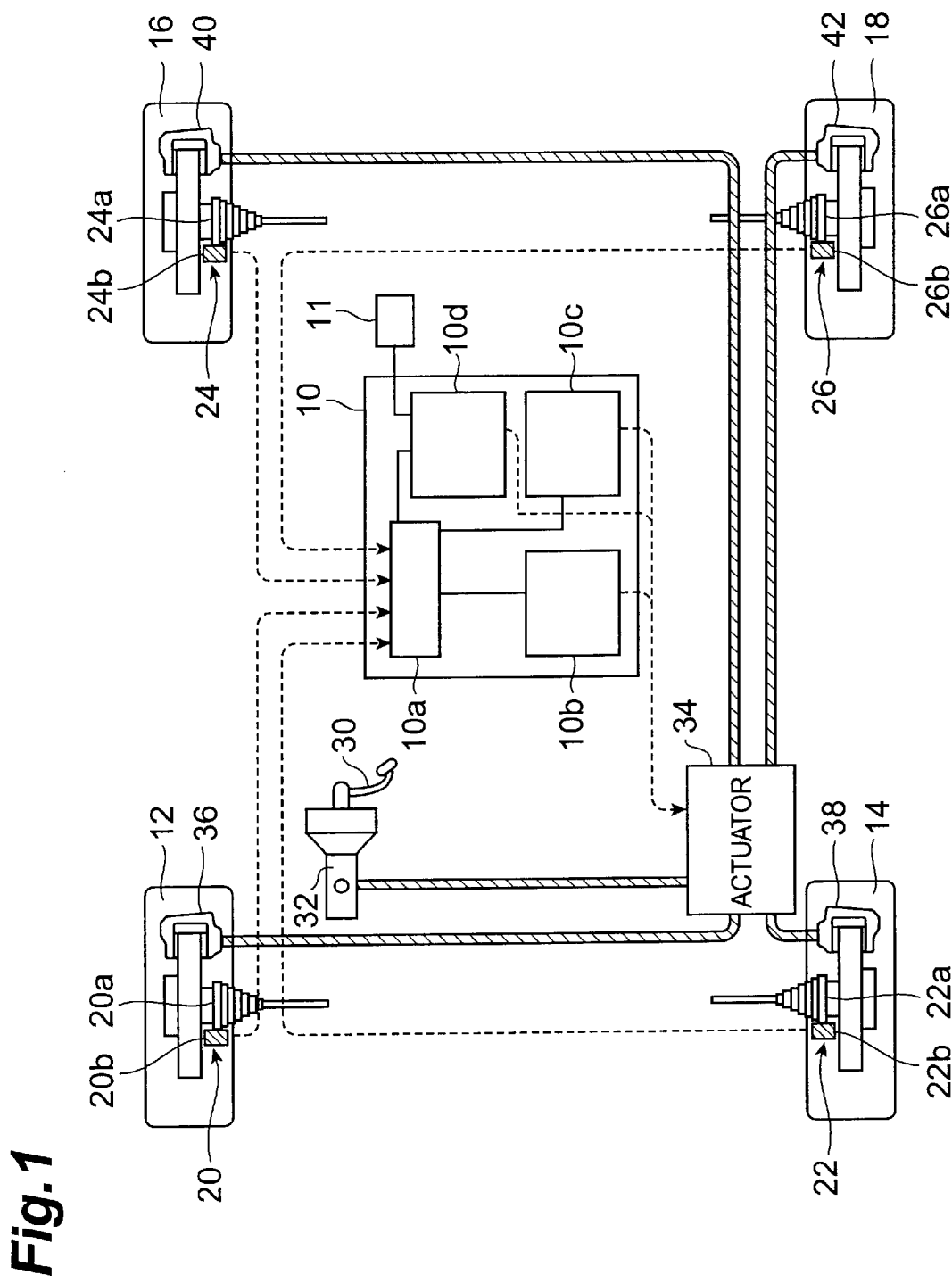
FIG. 1 is a drawing illustrating a configuration of a vehicle incorporating an embodiment of the rotational state detecting apparatus.

FIG. 1 is a drawing conceptually illustrating a configuration of a vehicle incorporating the rotational state detecting apparatus of the embodiment. This vehicle is equipped with a front right wheel 12, a front left wheel 14, a rear right wheel 16, and a rear left wheel 18, and also has a front right speed sensor 20, a front left speed sensor 22, a rear right speed sensor 24, and a rear left speed sensor 26 for the respective wheels 12, 14, 16, and 18.

An output from each sensor 20, 22, 24, or 26 is routed to an electronic control unit (hereinafter referred to as ECU) 10 controlling operating conditions of the vehicle. This ECU 10 is provided with a signal input section 10a receiving signals from the respective sensors 20, 22, 24, and 26 and outputting information concerning rotational speeds and rotational directions, and an ABS computer 10b controlling braking of the vehicle by utilizing the information outputted from the signal input section 10a. Here the signal input section 10a serves as the rotational direction detecting means, the halt detecting means, and the restricting means.

The ECU 10 also incorporates a traction control (TC) computer 10c for preventing slipping of the driving wheels by utilizing the information from the signal input section 10a, and a vehicle stability control (VSC) computer 10d for controlling the posture and action of the vehicle during cornering, based on the information from the signal input section 10a and yaw rate sensor 11.

The vehicle is equipped with a brake pedal 30 for allowing the driver to brake the vehicle. A master cylinder 32 connected to the brake pedal 30 generates a brake hydraulic pressure according to a stepping-on stroke of the brake pedal 30. The brake hydraulic pressure from the master cylinder 32 is transmitted through an actuator 34 to a front right wheel cylinder 36, a front left wheel cylinder 38, a rear right wheel cylinder 40, and a rear left wheel cylinder 42 located at the respective wheels 12, 14, 16, and 18.

The ABS computer 10b in the ECU 10 outputs a control signal to the actuator 34 to control hydraulic pressures of the respective wheel cylinders 36, 38, 40, and 42 at the respective wheels 12, 14, 16, 18, thereby performing the ABS control during braking of the vehicle.

For this purpose, the ABS computer 10b consists of a CPU for executing programs, memories such as RAM, ROM, and the like for storing the programs and data, and interfaces for exchange of data with the signal input section 10a and the actuator 34 as the ordinary computers do. An ABS system being an on-vehicle system is comprised of the brake pedal 30, the ABS computer 10b, the actuator 34, the wheel cylinders 36, 38, 40, 42, and so on.

The speed sensor 20, 22, 24, 26 disposed at each wheel 12, 14, 16, 18 consists of a rotor 20a, 22a, 24a, 26a being an annular rotating member to rotate together with the wheel 12, 14, 16, 18, and a magnetic sensor unit 20b, 22b, 24b, 26b being a detecting means for detecting passage of a detected portion provided at the rotor 20a, 22a, 24a, 26a and outputting a detection signal. The detected portion at each rotor 20a, 22a, 24a, 26a can be, for example, projections made of a magnetic material at regular intervals on the periphery of the rotor.

Each of the magnetic sensor units 20b, 22b, 24b, 26b consists of semiconductor magnetic sensors, such as a pair of Hall elements, a pair of MR elements, or the like, and a signal processing circuit, detects the passage of the projections or the like as a fine change of the magnetic field, and generates signals in an appropriate form for transmission to the ECU 10.

FIGS. 2A and 2B are timing charts for explaining the principle of the detection of rotational speed and rotational direction by making use of the magnetic sensor unit 20b. FIG. 2A represents an output signal from one of the pair of magnetic detectors and FIG. 2B represents an output signal from the other detector. The rotational speed of the wheel 12 can be detected by sequentially detecting rise intervals t1, t2, t3 of pulses from either detector, and the rotational direction of the wheel 12 can be detected based on the phase difference between pulses of the two detectors.

FIGS. 3A, 3B and 3C are timing charts for explaining a specific output from the magnetic sensor unit 20b or the like. FIG. 3A indicates an output signal of the magnetic sensor unit 20b generated based on the outputs of the pair of magnetic detectors shown in FIGS. 2A and 2B, in which rise intervals of pulses correspond to rotational speeds of the wheel 12 and levels of pulses to rotational directions of the wheel 12. Namely, low-level pulses indicate forward rotation and high-level pulses with a dent in the central portion backward rotation. FIG. 3B indicates a normal detection result of rotational directions of the wheel 12. In the present embodiment, when it is determined that the wheel 12 is in a halt, the signal input section performs a process of restricting a change of the rotational direction based on the output of the magnetic sensor unit 20b.

Namely, when the signal input section 10a determines that the rotational speed of the wheel 12 is not more than a predetermined value and that the wheel 12 is in a halt, the output of the rotational direction of the wheel 12 is maintained in a state before the halt of the wheel 12, as shown in FIG. 3C. Specifically, when the speed at the periphery of the wheel 12 is not more than about 3 km/h, i.e., when the pulse intervals from the magnetic sensor unit 20b, converted from the speed, becomes not less than about 50 mS, the change in the output of the rotational direction is ignored.

Figure 4:
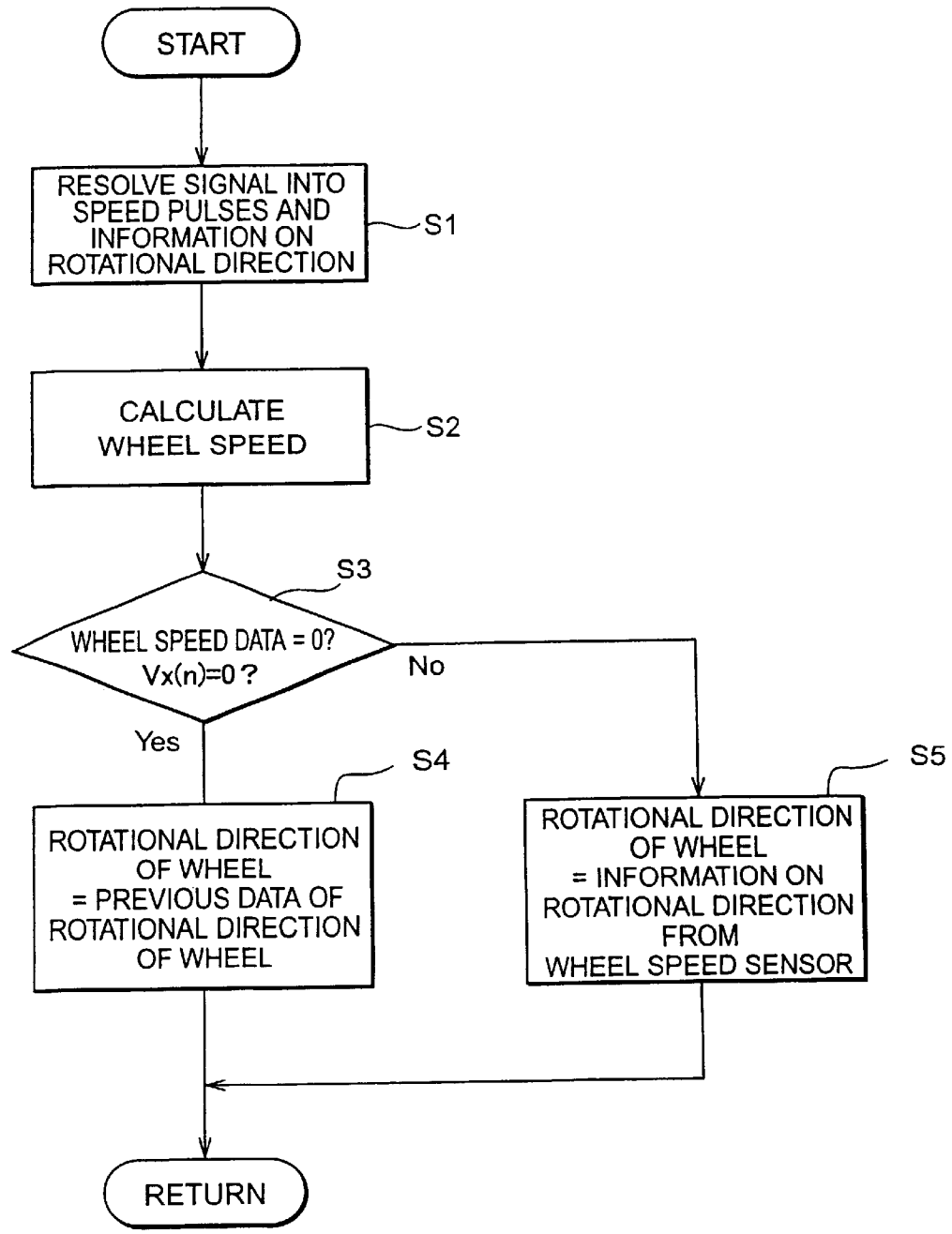
FIG. 4 is a flowchart illustrating operation of a signal input section provided in an ECU.

FIG. 4 is a flowchart for explaining the operation of the signal input section 10a in the ECU 10. The signal outputted from the magnetic sensor unit 20b is first resolved into speed pulses and information concerning the rotational direction (step S1). Then the resolved speed pulses are adequately processed and converted from analog data to digital data to compute information associated with the rotational speed of the wheel 12 (wheel speed data) (step S2). If on this occasion the speed at the periphery of the wheel 12 is not more than about 3 km/h, the wheel 12 is assumed to be substantially at a standstill and the wheel speed data is set to zero. This wheel speed data itself can be a result of computation in the ABS computer 10b.

It is then determined whether the wheel 12 is in a halt, based on the wheel speed data (step S3). When the wheel 12 is substantially in a halt, i.e., when the wheel speed data is zero, the signal input section moves to step S4 to maintain the previously detected information as the information concerning the rotational direction. On the other hand, when the wheel 12 is not in a halt, i.e., when the wheel speed data is not zero, the signal input section goes to step S5 to employ the output signal itself from the magnetic sensor unit 20b, i.e., presently detected information as the information concerning the rotational direction.

The above processing is also carried out for the other wheels 14, 16, and 18, based on output signals from the rest magnetic sensor units 22b, 24b, and 26b. This operation results in obtaining appropriate digital data about the wheel speeds and rotational directions of the respective wheels 12, 14, 16, and 18. For the rotational directions among these, the switching of direction is restricted with the computation result of wheel speed being zero, whereby it is feasible to prevent occurrence of a malfunction and occurrence of state hunting being repetitive switching of signs, due to an external magnetic field during halts of the wheels.

FIG. 5 is a drawing for explaining a specific example of the signal processing in the signal input section 10a. FIG. 5A indicates a graph showing an actual wheel speed curve. Dotted lines extending horizontally represent threshold values (about 3 km/h) within which the wheel speed is judged as zero. FIG. 5B is a graph showing the information about the rotational direction immediately after the resolution at step S1 of FIG. 4. FIG. 5C is a graph showing the information about the rotational direction after the correction through steps S4, S5 of FIG. 4. FIG. 5D is a graph showing the information about the wheel speed and rotational direction finally outputted from the signal input section 10a. The information that the ABS computer 10b and other receive from the signal input section 10a and then process, is digital data.

Figure 5A:
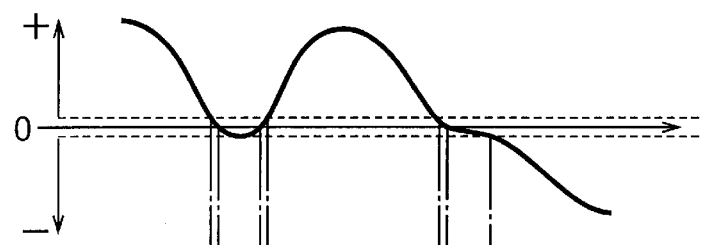
FIGS. 5A, 5B, 5C and 5D are diagrams for explaining a specific example of signal processing in the signal input section.
Figure 5B:
Figure 5C:
Figure 5D:
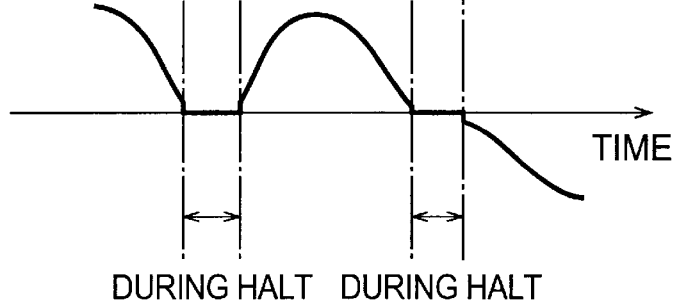

As apparent from comparison between FIG. 5B and FIG. 5C, the switching of rotational direction is restricted during halts where the computation result of the wheel speed is zero. During such halts, it is feasible to prevent occurrence of a malfunction of the rotational state detecting apparatus and the state hunting being repetitive switching of signs, due to an external magnetic field.

The ABS computer 10b operates in either of a normal brake mode, a decompression mode, a retention mode, and a pressure increase mode, based on the information about the wheel speed and rotational direction from the signal input section 10a. The summary of the operation will be briefly described below. In the normal brake mode, the ABS computer 10b supplies no control signal to the actuator 34 and thus a hydraulic pressure equivalent to a stepping-on stroke of the brake pedal 30 is transmitted to each of the wheel cylinders 36, 38, 40, 42 at the respective wheels 12, 14, 16, 18.

In the decompression mode based on detection of a sudden increase in slipping of a wheel, the hydraulic pressure supplied to either of the wheel cylinders 36, 38, 40, 42 corresponding to the slipping wheel is reduced at a fixed rate. In the retention mode to wait for recovery of the wheel, the hydraulic pressure to either of the wheel cylinders 36, 38, 40, 42 corresponding to the slipping wheel is retained in a decompression state in which the pressure is reduced by a predetermined amount from the pressure equivalent to the stepping-on stroke of the brake pedal 30.

In the pressure increase mode based on a judgment that the slipping of the wheel is ceased, the hydraulic pressure to the wheel cylinder 36, 38, 40, or 42 for the recovered wheel is maintained in a pressure increased state in which the pressure is increased by a predetermined amount from that in the retention mode according to the stepping-on stroke of the brake pedal 30. Safety and speedy braking of the vehicle can be implemented based on the ABS control to switch adequately among the operation modes as described above.

The TC computer 10c detects slipping of the driving wheels by utilizing the information from the signal input section 10a and information about the engine speed from the unrepresented engine and controls the throttle of the engine and the operation of the actuator 34, thereby effectively preventing the slipping of the driving wheels.

The VSC computer 10d detects signs of spin and drift during cornering by utilizing the information from the signal input section 10a and from the yaw rate sensor 11 and controls the operation of the actuator 34 and others to maintain the vehicle in a stable state.

In the operation of ECU 10 as described above, the signal input section 10a accurately detects the wheel speeds and rotational directions of the respective wheels 12, 14, 16, 18, so as to make adequate the ABS control, TC control, and VSC control by the respective computers 10b, 10c, and 10d. Further, since the switching of rotational direction is restricted with the calculation result of the wheel speed of 0, it is feasible to prevent occurrence of a malfunction and occurrence of the state hunting being repetitive switching of signs, due to an external magnetic field during a halt of either of the wheels 12, 14, 16, 18.

Particularly, in a situation wherein three out of the whole wheels 12, 14, 16, 18 are judged in forward rotation and the rest one in backward rotation, the ECU 10 could perform such processing that the running direction of the vehicle is indistinguishable. In the above embodiment, however, since the switching of the rotational direction is prevented during substantial halts of the wheels, the information about the running direction of the vehicle can be always obtained, so as to optimize the state control of the vehicle.

The present invention was described above according to the embodiment, but it is noted that the present invention is by no means intended to be limited to the above embodiment. For example, the above embodiment was the example wherein the ECU 10 was separated into the signal input section 10a, ABS computer 10b, TC computer 10c, and VSC computer 10d, depending upon the functions, but these arithmetic functions can be also realized by a single computer.

In the rotational-state-of-wheel detecting apparatus according to the present invention, when the halt detecting means detects a halt of a wheel, the restricting means restricts the change of the rotational direction detected by the rotational direction detecting means and thus the correct rotational direction is outputted in the substantially halt state of the wheel, whereby the on-vehicle systems can be made to act accurately.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An apparatus for detecting a rotational state of a wheel, comprising a rotating member to rotate together with the wheel, a detected portion provided at said rotating member, detecting means for detecting passage of said detected portion and outputting a detection signal, and rotational direction detecting means for detecting a rotational direction of the wheel, based on the output from said detecting means, said apparatus further comprising halt detecting means for detecting whether the wheel is in a halt or not, and restricting means for restricting a change of the rotational direction detected by the rotational direction detecting means, when said halt detecting means detects that the wheel is in a halt.

2. The apparatus according to claim 1, wherein said detected portion is a magnetic material and said detecting means is a magnetic sensor.

3. The apparatus according to claim 2, wherein said magnetic sensor is a pair of Hall elements or a pair of MR elements.

4. The apparatus according to claim 1, wherein said halt detecting means is means for detecting whether the wheel is in a halt or not, based on the output from said detecting means.

5. The apparatus according to claim 4, wherein said halt detecting means determines that the wheel is in a halt, when a wheel speed detected based on the output from said detecting means is not more than a predetermined value.

6. The apparatus according to claim 1, wherein information about the rotational direction outputted from said rotational direction detecting means is utilized in an antilock brake system.

7. The apparatus according to claim 1, wherein information about the rotational direction outputted from said rotational direction detecting means is utilized in a traction control system for preventing slipping of a driving wheel.

8. The apparatus according to claim 1, wherein information about the rotational direction outputted from said rotational direction detecting means is utilized in a vehicle stability control system for controlling a posture of a vehicle during cornering thereof.

\* \* \* \* \*